Oct. 4, 1932.                G. E. VOIGNIER                1,880,612
        APPARATUS FOR SHAPING THE MILLSTONES FOR RECTIFYING GEAR TEETH
                    Filed June 28, 1929        4 Sheets-Sheet 3

INVENTOR
GUSTAVE E. VOIGNIER
BY
Richards & O'Brien
ATTORNEYS

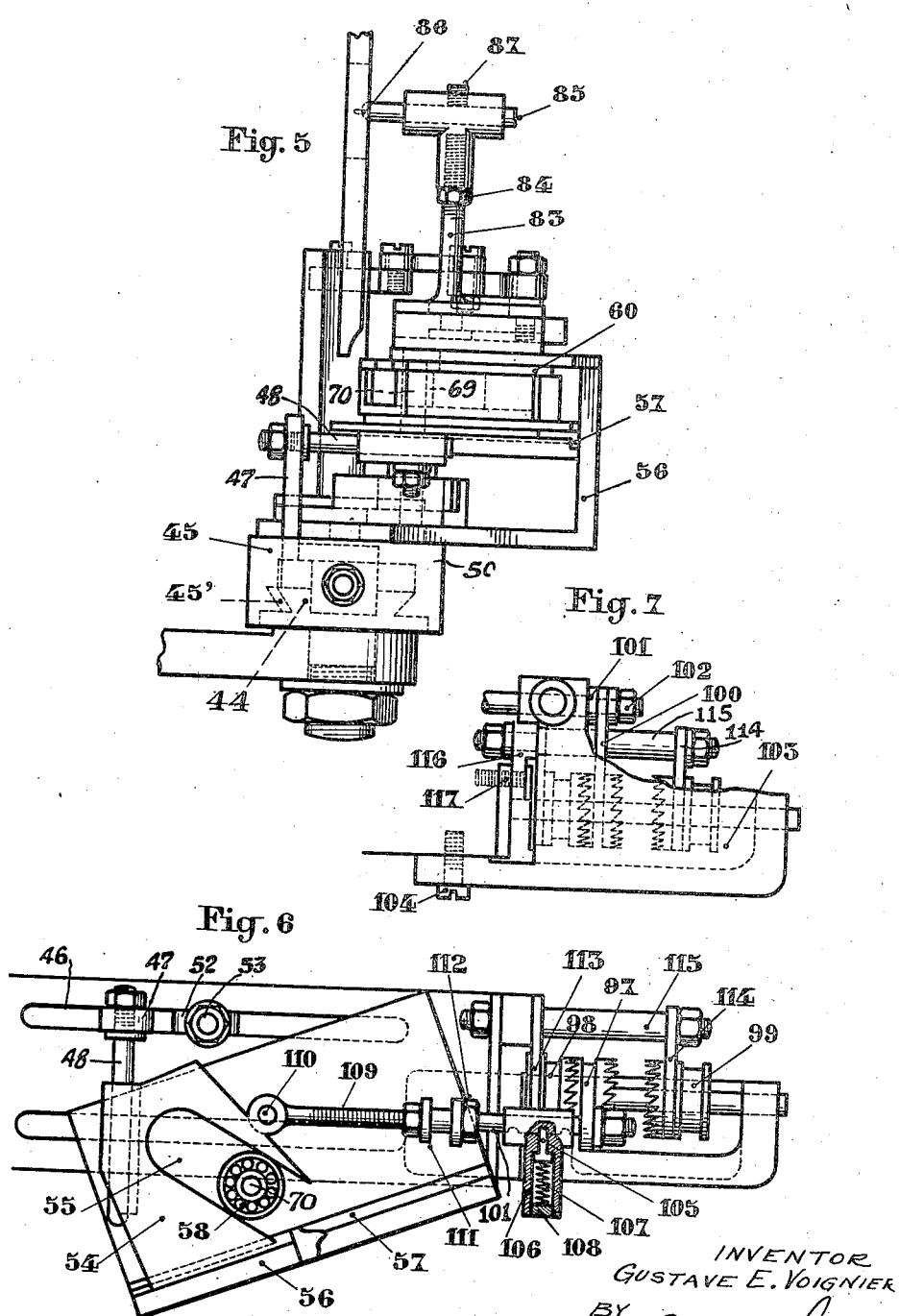

Patented Oct. 4, 1932

1,880,612

UNITED STATES PATENT OFFICE

GUSTAVE ERNEST VOIGNIER, OF PARIS, FRANCE

APPARATUS FOR SHAPING THE MILLSTONES FOR RECTIFYING GEAR TEETH

Application filed June 28, 1929, Serial No. 374,503, and in France July 27, 1928.

The present invention has for its object to provide an apparatus for shaping the millstones adapted for rectifying gear teeth. This apparatus is characterized by the fact that the outline of the tooth (generated by the point of a diamond which constitutes the tool) results in sliding movements of two rods sliding in guides, one of these guides having a rotary movement about a fixed point and the other a translatory movement.

The invention also has for its object:

A device for mounting the apparatus proper for effecting successively, and without dismounting, the rectification of the gears and the shaping of the millstones adapted for this rectification.

A method of construction of this apparatus provided with an adjustable and automatically operating device characterized in that the suitable displacement of the point of the tool is obtained by the convergence of the movable members towards an imaginary axis of which the position varies according to the number of teeth of the gear to be rectified and also according to the tooth profile and angle or line of pressure.

The various movements to be imparted to the apparatus mounted and constructed in this manner are imparted during the course of the operation either by the operator himself or by any suitable driving system.

In the accompanying drawings:—

Fig. 1 shows diagrammatically and by way of example different possible adjustments (the adjusting devices not being shown) of an apparatus constructed in accordance with the invention.

Fig. 2 also shows diagrammatically the manner in which the apparatus is mounted in accordance with the invention.

Fig. 5 is an end view of the same apparatus.

Fig. 6 shows a plan of an apparatus constructed according to the invention and driven by a motor.

Fig. 7 is a partial view in elevation of the same apparatus as above.

Figure 1:
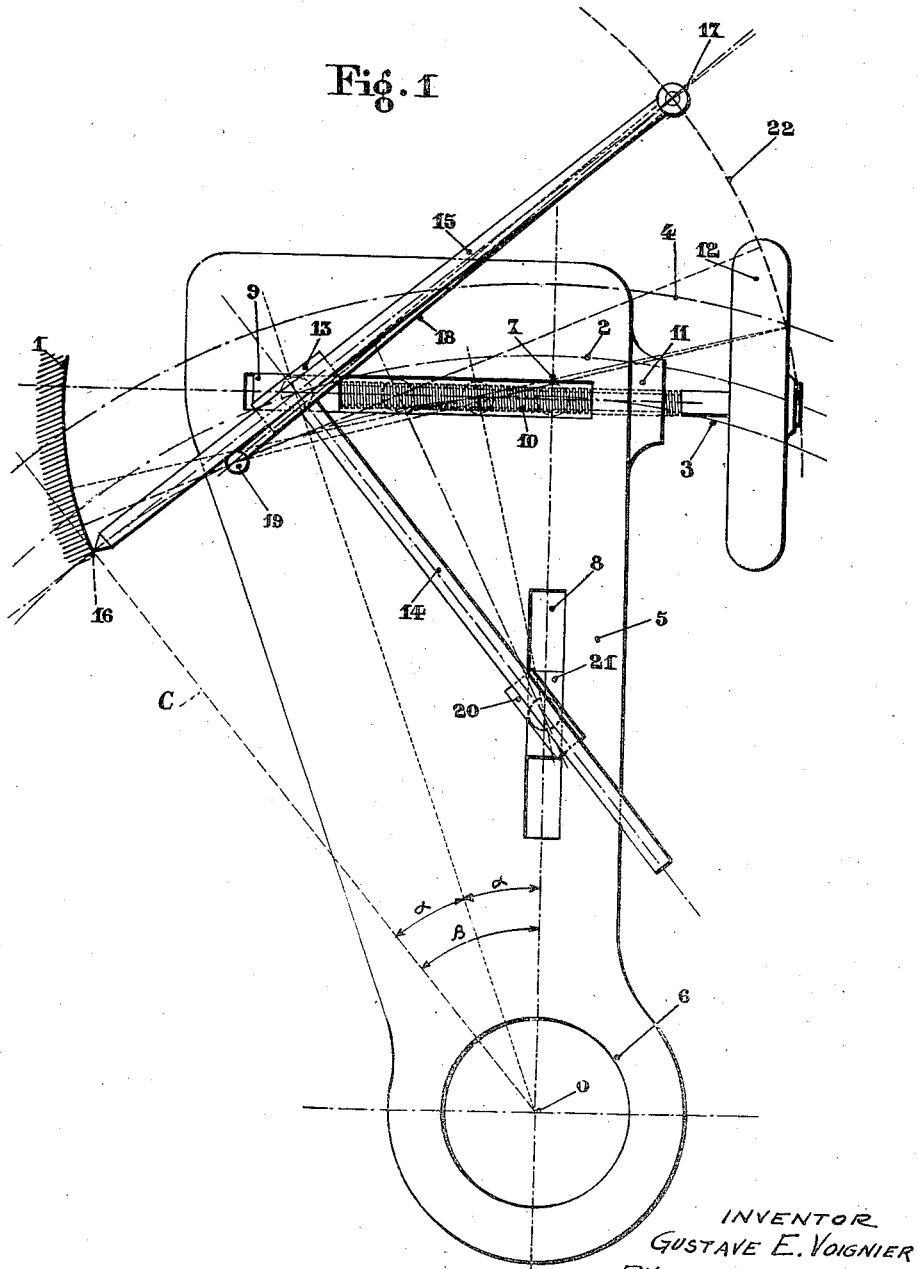

The apparatus illustrated diagrammatically in Fig. 1 is intended to be employed for the production of an outline approaching a development of a circle of a millstone 1 adapted to rectify the teeth of a toothed wheel with the center 0, the pitch circle being indicated at 2 whilst the circles passing through the bottom and tops of the teeth are respectively indicated at 3 and 4.

The apparatus is provided with a framework 5 which may, for example, be mounted upon a pivot bolt (Fig. 2) which passes through an opening 6 in the framework. This framework is represented by a single block in the drawings, but in reality it may be composed of a number of parts enabling it to be employed for toothed wheels of different diameters.

The framework 5 is provided with two straight line or circular guides secured thereto in adjustable positions, as regards their direction, by graduated frames and, as regards their straight line movement at right angles, by divided guides, this frame and these guides being capable of being provided, if necessary, with verniers and micrometer screws.

The guides include the guide 7 whose general direction approaches that of a tangent to the bottom circle 3 of the wheel, the radius drawn from the tangential point making with the radius drawn from the center 0 to the beginning of the outline, an angle $\beta$ which is double the angle $\alpha$ of pressure, as indicated in Fig. 1.

The other guide 8 has a general direction which is approximately that of a radius of the bottom circle.

These two guides therefore have directions substantially at right angles (in the accompanying drawings they have been shown as being rectilinear and disposed respectively along a tangent of the bottom circle and along the radius to the tangential point, but these particular positions are shown merely by way of example).

In the guide 7 may move longitudinally a slide 9, the movement of the said slide being determined, for example, by a screw 10 engaging with a screw threaded portion 11 of the framework and operable by means of a wheel 12. It will however be understood that any other method of moving the slide may be adopted.

To the slide 9 is pivoted a guide 13 forming a movable guide attached to a rod 14 secured in a position which is almost at right angles to the axis of the guide 13.

In the movable guide 13 may move longitudinally the slide 15 which carries at its end 16 the diamond point for shaping the millstone the other end 17 of the slide being provided with a pivot on which is mounted a rod 18 pivoting about a fixed point 19 whose position is adjustable on the framework.

The free end of the rod 14 may move longitudinally in a movable guide 20 pivoted on a slide 21 which can move in the guide 8 after preliminary marking.

Under these conditions the end of the diamond describes a curve having an angular point (or a point of retrogression according to the adjustment) which may be brought, by adjustment, on or within the bottom or base circle.

For a wheel of given diameter and tooth profile it is thus possible to obtain a more or less elongated outline of the mathematical outlines, but such that it permits of a practical and correct development of the toothed wheels gearing with one another, having regard to the conditions of speed, rotation, the couple transmitted and the elasticity of the material of which the gears are made and in general of all the factors which intervene for altering, during movement, the shape of the teeth when at rest.

The adjustments provided on an apparatus constructed as hereinbefore described are:

a. The orientation and the position of the guides 7 and 8 (it is also possible, when circular guides are applied to the apparatus, to select for them any optima curvatures).

b. The angle included between the rod 14 and the movable guide 13.

c. The length of the tool-carrying ruler 15.

d. The length of the rod 18.

e. The position of the fixed point 19.

It is useless to provide an adjustment of the position of the axis of the guide 13 on the slide 9, any more than an adjustment for the position of the axis of the guide 20 on the slide 21, these positions corresponding simply in the first case to an unwedging in height of the guide 7 and in the second case to an unwedging, without modification of the orientation of the guide 8.

The mounting of the apparatus above described is effected in the following manner (Figure 2):

A framework 22 supports the various members forming the entire machine and one of its lateral sides carries a vertical guide 23 in which is adapted to move and be secured, in any selected position, a slide 24 in the form of a column bored vertically to receive the shaft 25 on which is secured the pinion 26 to be rectified.

The shaft 25 is free to turn in the slide 24 and is held therein in any angular position corresponding with the graduations of a dividing device mounted at the lower end of said shaft.

The upper face of the said framework 22 is in the form of a bench and receives:—

1. A large carriage 27 on which is mounted the millstone 1.

2. A small carriage 28 on which is pivoted at 0 the shaping apparatus.

The two carriage 27 and 28 are secured respectively by nuts 29 and 30 through which passes a screw spindle of which the portion 31, which engages with the nut 29 is of the same pitch as the portion 32 passing through the nut 30, but with a single thread, whilst the portion 32 has a double thread in such a manner that upon turning the crank 33, secured to the spindle, in one direction or the other, the carriages 27 and 28 move longitudinally and in the same direction but at linear speeds which are respectively in the proportion of one for the carriage 27 to two for the carriage 28. A similar result would be obtained by making the portion 32 of the spindle of a pitch twice that of the portion 31.

The millstone 1 is mounted on a shaft 34 which may be rotated by any suitable driving means and which rests in a bearing secured in a plate 35 of which the base can move transversely on the carriage 27 and be locked on the said carriage in any selected position.

When mounting the carriages on the bench by the engagement of the nuts 29 and 30 with the screw spindle 31—32, this mounting is effected in such a manner that the distance $a$ of the axes of the pinion 26 and of the wheel 1 are equal to the distance $b$ between the axis of rotation of the millstone 1 and the pivotal axis 0 of the shaping apparatus, this condition being necessary in order that the radius $c$ of the circle of which the axis of the stationary guide 7 is the tangent may be equal to the radius $d$ of the pitch circle of the pinion to be rectified.

The longitudinal movements of the carriage 28 being twice those of the carriage 27 this condition is always fulfilled when the mounting of these carriages on the spindle 31—32, has been effected correctly.

The device operates in the following manner:—

The millstone 1 being rotated, the pinion to be rectified is presented in front of it by vertical movement in such a manner that the millstone engages in the space between two teeth. The rectification of this space having been completed, the pinion is lowered vertically, the dividing device causes it to turn through an angle corresponding to the pitch of the circle and the pinion again raised in front of the millstone, which is constantly in rotation, the next space rectified and the procedure repeated until the whole pinion has been rectified.

When by reason of wear the millstone no longer has the correct shape for the rectification, the pinion 26 is removed and the crank 33 is operated in such a manner that the millstone 1 is fed towards the shaft 25 through a distance equal to its radial wear. At the same time the carriage 28 has followed this movement and the diamond point 16 of the shaping apparatus is placed on the circle of origin of the millstone corresponding with the base circle of the pinion to be rectified.

The shaping apparatus being operated by the wheel 12 and the millstone 1 being always in rotation, the outline of the said millstone is correctly re-established by developing a circle suitable for the dimensions of the pinion to be rectified and to the selected profile when the selection of the dimensions of the rod 18 and of the position of the stationary point 19 have been properly made.

Figs. 3, 4, 5, 6 and 7 show the detailed construction of the apparatus proper. As will be seen in the drawings this apparatus is provided with a first carriage referred to as the driving carriage which may be actuated by the wheel 36 operated by hand or by a double clutch system when the device is operated by a motor (which is the case in Figs. 6 and 7).

The driving carriage is composed of a framework 37 which may be secured to a securing foot 38 by means of a bolt 39. The securing of the framework of the carriage may however be accomplished in different ways and the mode illustrated is given only by way of example.

To the framework 37 are secured two bearings 40 and 41 which support and hold a screw 42 to which is secured the wheel 36. The screw 42 receives a nut 43 which can move along the framework in which it is guided by the guide 44 (Fig. 5).

The U-shaped member 45 (Fig. 5) completes the driving carriage and can move on the guide 44. A wedge 45¹ enables any play which may exist between the members 37 and 45 to be eliminated.

The member 45 which can move longitudinally on the member 37 is longer than the latter so as to permit of a sufficiently large relative longitudinal movement. On the upper face of the member 45 is provided a longitudinal mortise 46 in which can move an arm 47 secured to the nut 43. The upper end of the arm 47 carries a finger 48 at right angles to the axis of the carriage.

At the ends of the member 45 are secured plates 49 and 50, the first (49) being referred to as the stop plate and the second (50) as the holding plate of the spring guide. These two plates at the same time serve to protect the slide.

A spring 51 located between the plate 50 and the bearing 41 constantly tends to press the carriage against the stop plate 49.

In the mortise 46 of the member 45 can move a stop 52 (Fig. 4) which may be secured in any selected position by means of a nut 53.

On the finger 48, which is in the form of a shaft, is freely mounted a fork 54 (Fig. 4, but shown more clearly in Fig. 6) which may have any selected shape and is provided with a notch 55 which may have any dimensions and any suitable inclination. The fork 54 is held in position against the set square 56 by a guide 57 (Figs. 4 and 5) secured to the set square.

When the screw 42 is turned by means of the wheel 36, to the right for example, the fork moves relatively to the two longitudinal and transverse axes of the set square 56. It therefore causes the position of a roller bearing 58 (Figs. 3 and 6) to be changed, and this more or less rapidly according to the inclination of the prongs of the fork, relatively to the general axis of the apparatus.

If the turning of the screw is continued until the arm 47 meets the stop 52 then, when contact is made between these two parts, the fork 54 can no longer move relatively to the set square 56. The member 45 is then, under the constant action of the spring 51, moved rearwardly through a distance equal to or greater than that which radially separates the base circle and the bottom of the teeth of the pinion to be rectified. By turning the screw 42 to the left the various members of the system are returned to their initial positions.

The set square 56 is secured to the driving carriage by means of two screws 58' and 59 in such a position that its longitudinal axis forms with the axis of the carriage an angle equal to the pressure angle.

Figure 3:
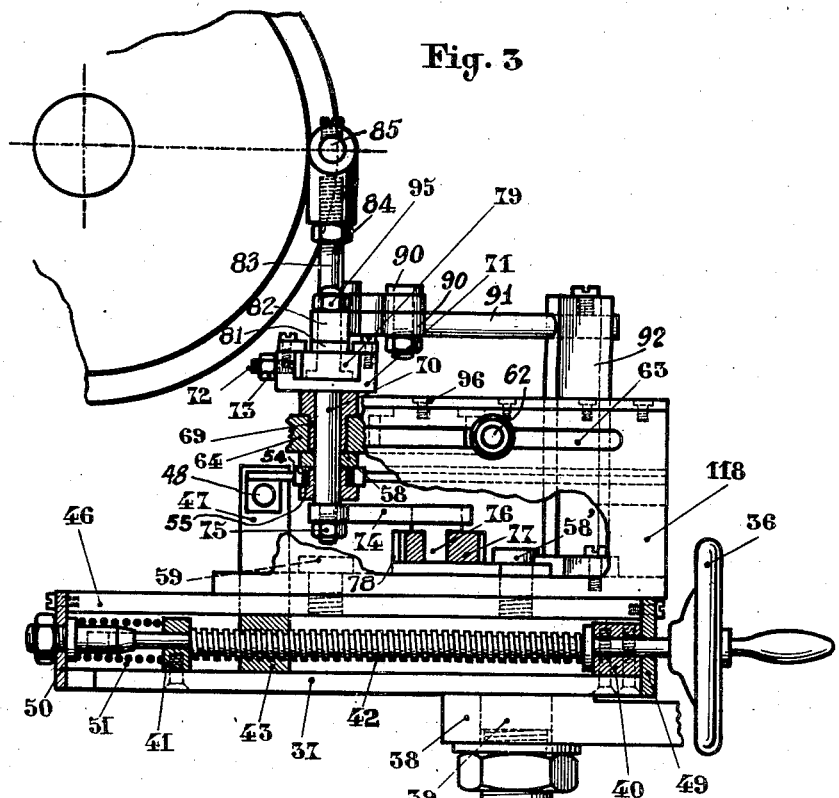
Fig. 3 is an elevation in detail, partly in section and partly broken away, of an apparatus constructed in accordance with the invention.

On the set square is mounted a member 60 (Fig. 5) referred to as the die support, secured to the set square by the screws 61 and 62 (Fig. 4) and at an inclination relatively to the set square corresponding with the pressure angle. The member 60 can move longitudinally on the set square in the mortise 63 (Fig. 3).

The member 60 carries a die 64 held without play by wedges 65 and 66 (Fig. 4) secured by screws 67 and by a thickness wedge 68 which may be adjusted from the side by means of suitable screws and lock nuts.

The die 64 is provided with a hole which receives a ring 69 having a shoulder and which serves to seat a vertical shaft 70 of which the upper portion 71 is formed as a guide.

The lateral play which may exist in this guide is taken up by a bolt 72 and a lock nut 73.

The shaft 70 carries at the lower portion the ball bearing 58 referred to as the driving roller of the apparatus and which is placed between the two prongs of the fork 54.

At the lower end of the shaft 70 is mounted a square guide 74 which is enclosed in a square, but it may be secured in any other manner, and which is held by a nut 75. This square guide is placed at right angles to the guide 71. Its outer end is held in a small transverse slide or guide 76 which at the start imparts to it a position parallel to the driving carriage.

The guide 76 itself engages with another guide 77 whose axis forms with the general axis of the driving carriage an angle equal to twice the pressure angle. The guide 77 is mounted in a support 78 of which the inclination is adjustable. Wedges are provided in the guides 76 and 77 so as to enable play to be taken up.

In the member 71 is fitted a slide 79 which is held therein without play by two upper wedges and by a lateral wedge of which the position is always adjustable from the side by means of a screw and lock nuts.

The slide 79 is provided with a groove 80 in which may be secured the pivot shaft 81 of a rod 82 as also the support 83 (Fig. 5) of the diamond. The position of this support relatively to the horizontal axis passing through the center of the millstone may be secured by a lock nut 84 which enables the height of the support to be adjusted. Upon the rod 83 is mounted a T-shaped member through whose horizontal portion passes the rod 85 which carries the diamond point 86. A screw 87 secures the rod 85 in position in the support.

The rod 82 hinged at 81 to the member 79 is secured, at its other end, to an eye 88 which enables it to be pivotally secured to a second rod element 89 by means of a bolt 90, this latter pivot enabling the member 79 to be adjusted in position without it being necessary to change any member.

The small rod 89 is connected to a rod 91 secured to a member 92 whose angular position relatively to the set square is variable and may be adjusted by means of a screw 93 which engages in a curved slot 94. This device enables a variable angle to be imparted to the rod 91 according to the corrections to be made in the outline of the teeth.

The hinges 81 and 90 are suitably provided with rings so that the subsequent replacing of these rings enables any play due to wear to be taken up.

The small rod 82 is secured to the end of the member 79 by a nut 95 and a wedge 96 adjusts the position of the member 60 in the mortise 63.

The whole of the device is secured to a feed carriage by means of the securing foot 38 of the member 37. The whole device can turn upon itself in order to permit of the advance or withdrawal of the millstone at the will of the operator.

Figure 2:
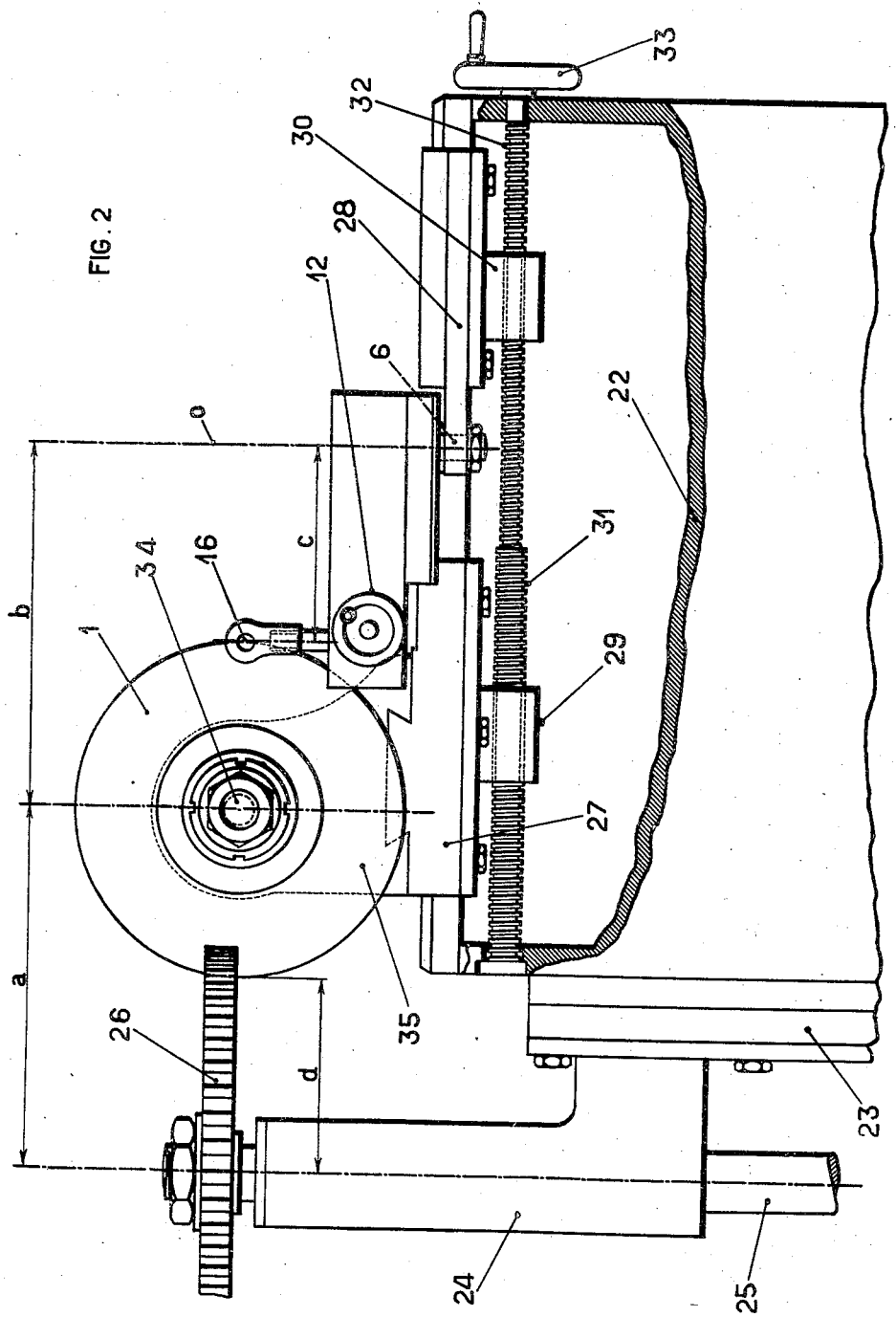
Figure 4:
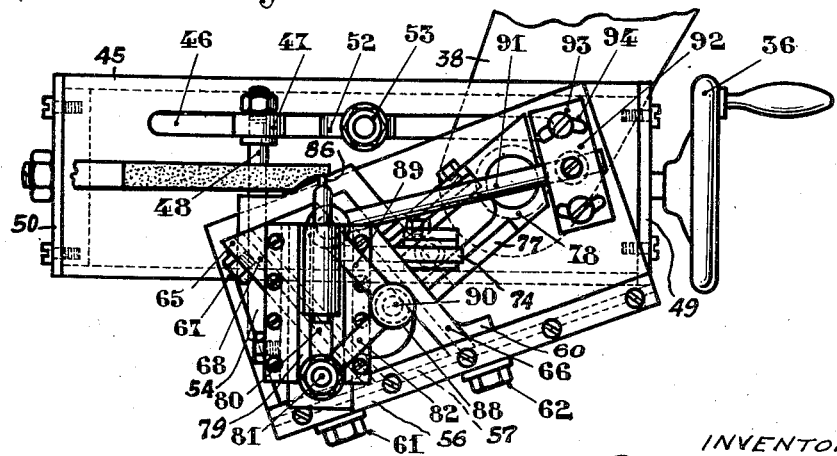
Fig. 4 is a plan of the same apparatus.

The operation of the mechanism shown in Figs. 3, 4 and 5 is as follows: It will be understood that the mechanism illustrated in these figures is mounted as indicated in Figure 2, so that the diamond point 86, which is indicated at 16 in Fig. 2, is positioned at the periphery of the millstone or grinding wheel, the latter being positioned on an adjustable carriage between the outlining or shaping apparatus and the support for the gear to be rectified. The millstone is constantly rotated in any suitable manner, and when the same has become worn after grinding the teeth of a gear, the carriage supporting the shaping apparatus is moved toward the millstone until the diamond tool is opposite a point on a circle corresponding to the base circle of the gear teeth. The tool point is then given a movement along a predetermined curve to cut the millstone to the proper outline by suitably adjusting the fixed pivot 81 and then operating the wheel 36, whereupon the diamond point is given a movement having components parallel to and transversely to the axis of the millstone. It will be understood that by adjustment of the pivot 81, which corresponds to the pivot 19 of Fig. 1, the curvature of the path of the diamond point can be predetermined.

The hereinabove described assembly functions in the following way (the elements in Figure 1 corresponding to those to be mentioned are indicated in parentheses): Element 60 is first locked in position on square 56 as may be desired; rod 91 (center 19) is then locked in position on support 92 to obtain the correcting effect; slide 77 is also locked on position (slide 21) as desired; finally the angle between compass arms 82 and 89 is regulated by locking axis 90 (length of link 18); with the foregoing structures in the positions indicated, operation of the machine will cause element 64 (slide 9) to move into element 60 (slide 7) thus displacing axis 70 and the upper part of slide 71 (slide 13); rotation of the latter in element 64 is controlled by a square 74 (rod 14) which slides in guide 76 (movable slide 20), the latter rotating in guideway 77 (guideway 21).

Slide 71 assures proper orientation of rule 79 (rule 15) which moves in the latter through a distance limited by compass 82, 90, 89 (element 18).

From the foregoing it may be seen that the point of articulation of slide 9, of guide 13 moves along a straight tangent to the base circle and that guide 13, or, more exactly, slide 15 does not describe tangents to the real base circle, but to a curve which approaches the form of a circle, the radius of which differs from that of the base circle, the tangents obtained being corrected by connecting rod 18 coupled at 17 to slide 15 and turning about a fixed point 19 which may be adjusted.

On account of this correcting by the connecting rod, it becomes possible, by moving fixed point 19, to make any desired correction in the gear system. The profile and diameter of the teeth of a pinion thus corrected, though not of absolutely mathematical precision (this profile differs from the geometrical profile by less than a thousandth of a millimeter), are sufficiently so to obtain silent operation.

By comparison of Figures 3, 4 and 5, it will be seen that slide 9 of Figure 1 corresponds to element 64, support 60 to guide 7, axis 70 to the intersection of the axes of slide 9 and guide 13, slide 79 to slide 15, guide 76 and 77 to guide 20 and slide 21 respectively, and connecting rod 82 to connecting rod 18. Since support 60 is fixed to square 66 by screw 61 and 62, it suffices to displace said square to place shaft 70 on the requisite diameter of the first circle. Element 79 may be then keyed in position relatively to element 60 at the required angle and there remains only the steps of locking one or the other of the two slides in position and placing the diamond at the desired length to describe a tangent to the base circle, to proceed with a milling operation.

The adjusting gear of the apparatus does not require very great precision. By means of connecting rod 18, (or 82) any desired correction may be effected by displacing fixed point 19.

The movements of the various members may be rendered automatic by means of a control by any suitable transmission means producing the rotation of the screw 42 without it being necessary to act on the wheel.

In this case the apparatus is provided with a device of the type illustrated in Figs. 6 and 7. This device differs from that shown in Figs. 3, 4 and 5 in the provision of a dog clutch 97 keyed to the shaft of the screw 42 for driving the latter. On this same shaft are also adapted to slide longitudinally two loose pulleys 98 and 99 each secured to a clutch member which may come into engagements with one of the faces of the member 97. The two pulleys 98 and 99 are driven by belts, one of these belts, that which drives the pulley 99, for example, being crossed in such a manner that the pulleys are caused to rotate in opposite directions. When the pulley 98 has its clutch face in engagement with the double clutch 97, the screw, for example, turns in a clockwise direction and causes the finger 48 of the nut 43 to advance until the arm 47 meets the stop 52. At this moment, and as described above, the member 45 moves backwardly and drives the two loose pulleys 98 and 99.

During the return movement the pulley 98 pushes the dog clutch 97, which can move longitudinally on its key and which is thus released from the two loose pulleys 98 and 99, these pulleys then continuing to rotate on the shaft of the screw.

The double dog clutch 97 is held and guided by a fork 100 (Fig. 7) secured to a shaft 101 by means of a nut 102.

The shaft 101 can slide in a framework 103 which may be secured to the end of the lower part 37 of the driving carriage by means of screws 104. The said framework at the same time serves as a bearing for the extension of the screw 42 on which are mounted the clutch teeth.

The shaft 101 may be secured in the three positions which it may occupy (clutch teeth in engagement with the pulley 98, neutral, and in engagement with the pulley 99) by means of bolt 105 mounted in the framework 103 and which may engage with three sockets suitably spaced and provided on the shaft. The bolt proper is located in a body 106 screwed by means of a screw thread into the framework and enclosing a spring 107 disposed between the bolt 105 and a screw 108 and which tends constantly to push the bolt into the notches.

When in view of the return movement of the member 45, the bolt 105 has escaped from the notch of the shaft 101 which is towards the outside, against the action of the spring 107, it comes suddenly into the middle notch which produces a sudden longitudinal movement of the shaft 101 and, by means of the fork 100, and the disengagement of the teeth the clutch 97 from the pulley 98 and its engagement with the pulley 99.

By reason of the opposite direction of rotation of the two pulleys the screw 42 is then driven in an anti-clockwise direction and the carriage 45 moves towards the stop plate 49 driving in its movement the teeth of the double clutch 97 until the bolt 105 falls into the middle socket. The screw 42 continues to rotate in an anticlockwise direction until the whole of the device has again assumed the position which it occupies at the start.

To the fork 54 is secured a rod 109 mounted in a shaft 110. The end of the rod 109 is free and formed as a fork, the prongs of this fork engaging in opposite sides of the shaft 101 which carries at its end a washer 111 of which the position can be adjusted by means of a nut 112. A certain amount of free space is left between the washer 111 and the prongs of the fork at the end of the rod 109, which is adjustable in such a manner that when the carriage has completed its return movement and consequently when the diamond has left the millstone, the fork, pressing against the washer 111, moves the shaft 101 towards the left until the bolt 105 falls into the last socket at the right which produces the disengagement of the clutch member 97 from engagement with the pulley 99 and its engagement with the pulley as at the beginning of the movement.

The two pulleys 98 and 99 are provided with grooves with which are engaged respectively the forks 113 and 114 adjustably fixed to a shaft 115 secured to a member 116 attached by screws 117 to the end of the member 45. This device enables the position of the loose pulleys to be adjusted on the shaft of the screw 42.

An apparatus constructed in the manner above described permits of operating millstones capable of rectifying gears provided with any number of teeth and irrespective of the profile of these gears, the adjusting means above described enabling the apparatus to be adapted for the production of various outlines.

When the tool is to pass from one face of the millstone to the other it suffices to cause the set square to pivot in such a manner that it is caused to occupy relatively to the longitudinal axis of the apparatus, a position symmetrical to its position of operation and so cause the die carrying member to turn about itself in its bearing and through a suitable angle.

If it is desired to outline the millstone on both sides at once an identical but duplicated apparatus may be constructed provided either with a single control finger 48 disposed opposite the millstone or with two fingers placed symmetrically on each side of the said millstone.

The apparatus may be enclosed by a sheet metal plate 118 which covers the mechanism whilst providing for the passage of the millstone, the support of the diamond being the only projection above this casing.

It will be understood that the mechanism which is illustrated in Fig. 1 as also the method of mounting to which Fig. 2 applies are purely diagrammatic and that the adjusting devices are not illustrated. It will also be understood that in the method of construction illustrated in Figs. 3, 4, 5, 6 and 7 the dimensions and the shapes of the various parts of the apparatus, as also the pivots, guides and slides may be constructed in any other preferred shape, and that the driving element may be of any type without departing from the scope of the invention.

I claim:

1. Apparatus for outlining millstones for the rectification of gear teeth, comprising in combination, a stationary base, a tool holder, a guide on said base slidably supporting said tool holder, said guide being rotatable, means for moving said guide linearly, whereby the curve described by the end of a tool fixed to said holder may be controlled, and a rod pivotally connected to said tool holder at a point spaced from the tool-carrying end thereof, the other end of said rod being fixed, whereby upon linear movement of said guide it is simultaneously rotated.

2. Apparatus for outlining millstones for the rectification of gear teeth, comprising in combination, a stationary base, a tool holder, a guide on said base slidably supporting said tool holder, said guide being rotatable, and means for moving said guide linearly, whereby the curve described by the end of a tool fixed to said holder may be controlled, said means including a second guide upon which said first guide is rotatably mounted.

3. Apparatus for outlining millstones for the rectification of gear teeth, comprising in combination, a stationary base, a tool holder, a guide on said base slidably supporting said tool holder, said guide being rotatable, means for moving said guide linearly, whereby the curve described by the end of a tool fixed to said holder may be controlled, a carriage for supporting the millstone in a vertical plane, means for adjusting said millstone transversely of its face, a screw engaging said carriage for adjusting the same longitudinally, a second carriage for supporting the outlining apparatus, and a screw engaging said second carriage to move the latter longitudinally, said screws being connected to operate in unison and being so formed that said second carriage moves twice as rapidly as the first.

In testimony whereof I have signed this specification.

GUSTAVE ERNEST VOIGNIER.